United States Patent
Padmanabhan et al.

(10) Patent No.: US 8,423,432 B1
(45) Date of Patent: Apr. 16, 2013

(54) SYSTEM AND METHOD FOR AUTHORITATIVE ITEM IDENTIFICATION BASED ON FACILITY OPERATIONS

(75) Inventors: Priya Padmanabhan, Issaquah, WA (US); Samir Kumar, Issaquah, WA (US); Alexander C. Prater, Seattle, WA (US); Prajakta Vaidya, Bellevue, WA (US); Eric Young, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 649 days.

(21) Appl. No.: 12/553,629

(22) Filed: Sep. 3, 2009

(51) Int. Cl.
*G06Q 40/00* (2012.01)
(52) U.S. Cl.
USPC .......................................................... 705/28
(58) Field of Classification Search ...................... 705/28
See application file for complete search history.

(56) References Cited

U.S. PATENT DOCUMENTS

2008/0290162 A1* 11/2008 Siotia et al. .................. 235/385

* cited by examiner

*Primary Examiner* — Russell S Glass
(74) *Attorney, Agent, or Firm* — Robert C. Kowert; Meyertons, Hood, Kivlin, Kowert & Goetzel, P.C.

(57) ABSTRACT

Various embodiments of a system and method for authoritative item identification based on facility operations are described. Embodiments may include an authoritative item identification component configured to, for each particular item of multiple items in inventory of a materials handling facility, determine multiple identifiers for the particular item, where one or more of the multiple identifiers are electronically obtained from a unit of the particular item during operations of the materials handling facility. The authoritative item identification component may, for each of the multiple identifiers, determine a quantity of instances in which that identifier was electronically obtained from a given unit of the particular item. The authoritative item identification component may, based on a statistical analysis of the quantities, determine one of the multiple identifiers as being an authoritative identifier for the particular item. The authoritative item identification component may identify one or more units based on the authoritative identifiers.

24 Claims, 6 Drawing Sheets

SYSTEM AND METHOD FOR AUTHORITATIVE ITEM IDENTIFICATION BASED ON FACILITY OPERATIONS

BACKGROUND

In a distribution system, a retailer or other product distributor (which may collectively be referred to as distributors) typically maintains an inventory of various items at one or more distribution centers. The inventory items are ordered from one or more vendors, received at the distribution centers as inbound shipments, and stocked in inventory of the distribution centers. In an order fulfillment process, orders for items may be received from customers of the distributor. Units of the ordered items are picked from various locations of inventory in the distribution centers, processed for shipping, and shipped as outbound shipments to the customers. A distribution network may include any number of such distribution centers in order to fulfill customer demand. In some cases, inventory items within a distribution center may be tracked by one or more identifiers, some of which are non-unique across different items.

While various embodiments are described herein by way of example for several embodiments and illustrative drawings, those skilled in the art will recognize that various embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope of various embodiments as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a system and method for authoritative item identification based on facility operations are described. In various embodiments, elements of the system and method for authoritative item identification may be integrated with operations of a materials handling facility, such as materials handling facility 100 described below. Materials handling networks, such as fulfillment networks, may include a variety of materials handling facilities including elements for performing a variety of operations, an overview of which is provided herein below. Such materials handling facilities may be configured to process units of inbound inventory for shipment to customers (and/or other materials handling facilities within a distribution network).

Figure 1:
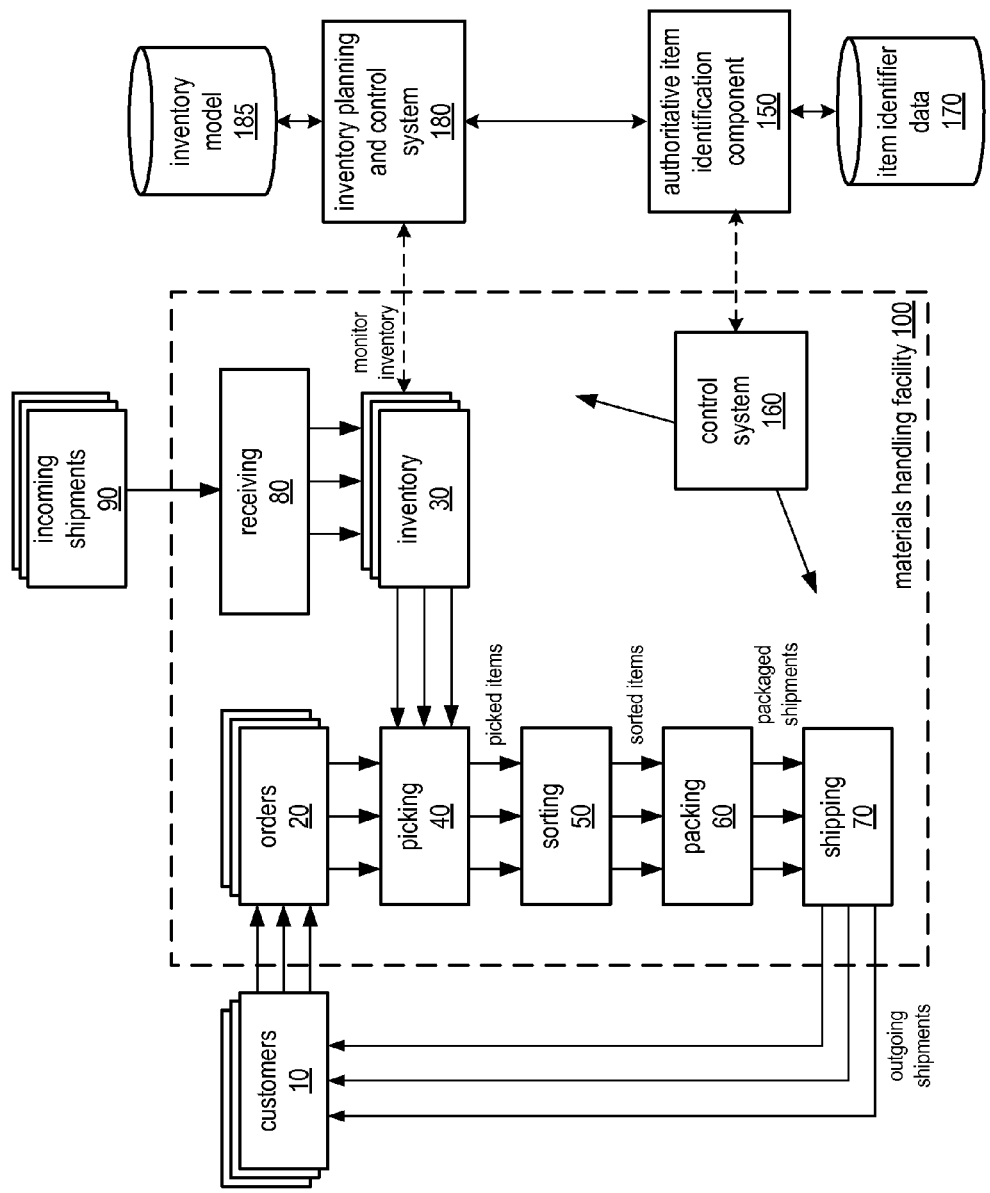
FIG. 1 illustrates a logical representation or view of the operation of an example materials handling facility, according to some embodiments.

FIG. 1 illustrates a logical representation or view of the operation of one example of a materials handling facility 100 according to various embodiments. In various embodiments, a materials handling facility may include one or more facilities that process, store, and/or distribute units of items including but not limited to warehouses, distribution centers, hubs, order fulfillment centers, nodes in a supply chain network, retail establishments, shipping facilities, stock storage facilities, or any other facility configured to process units of items. For example, this Figure may illustrate a fulfillment center of a product distributor or e-commerce enterprise. Multiple customers 10 may submit orders 20 to the product distributor, where each order 20 specifies one or more units of items from inventory 30 to be shipped to the customer that submitted the order. To fulfill the customer orders 20, the one or more units of items specified in each order may be retrieved, or picked, from inventory 30 (which may also be referred to as stock storage) in the materials handling facility, as indicated at 40. Picked units may be delivered or conveyed, if necessary, to one or more stations in the materials handling facility for sorting 50 into their respective orders, packing 60, and finally shipping 70 to the customers 10. In various embodiments, picked units may be delivered to an induction station, where the units are inducted into a sorting system (e.g., a sorting mechanism, sorting process, or some combination thereof). One example of such a sorting system may include a Crisplant® sorter. The units may then be routed to particular destinations in accordance with the requests (orders) currently being processed, e.g. to sorting or packing stations, under direction of the control system. Various other sorting mechanisms and processes (which may be represented by sorting 50) may be utilized in some embodiments. A picked, packed and shipped order does not necessarily include all of the units ordered by the customer; an outgoing shipment to a customer may include only a subset of the ordered units available to ship at one time from one inventory-storing location. In other cases, units of the order may be split into multiple shipments for a variety of reasons including but not limited to space and/or economic efficiency.

To replenish inventory 30, materials handling facility 100 may also include a receiving 80 operation for receiving shipments of stock from one or more sources (e.g., vendors) and for placing the received stock into inventory 30. The receiving 80 operation may also receive and process returned purchased or rented units or orders from customers. At least some of these units are typically returned to inventory 30. The various operations of a materials handling facility may be located in one building or facility, or alternatively may be spread or subdivided across two or more buildings or facilities.

As used herein, the term "item" may refer to a particular type of item and the term "unit" may refer to a particular instance of an item. For instance, an item might refer to a particular brand and model of a television, and multiple units of that same television might be stocked as inventory within a materials handling facility.

Also illustrated in FIG. 1, various embodiments may include a control system 160 which may control some or all of the operations within materials handling facility 100, including those operations illustrated. In one example, control system 160 may direct units of items to particular locations within the materials handling facility (e.g., for order fulfillment). For instance, the control system 160 may track items that are received at receiving stage 80 and direct such items to an appropriate location within inventory 30. Such directing may be implemented by generating instructions for agents, including but not limited to human agents within the materials handling facility and/or automated elements (e.g., robotic, automated devices, mechanized devices, etc.). Control system 160 may perform similar direction of items within the various other operational stages of the materials handling facility (e.g., picking, sorting, packing, shipping, etc.).

FIG. 1 also illustrates an inventory planning and control system 180, which may be configured to generate and/or maintain an inventory model 185. Inventory model 185 may include a stored representation of the items that are stored as inventory 30. For instance, inventory model 185 may include a listing of multiple items and respective locations (e.g., a bin, container, shelving location, or other location) at which each item is stored within the materials handling facility 100 (or proximate to the materials handling facility 100). In various embodiments, inventory planning and control system 180 may periodically or aperiodically update inventory model 185 to represent an updated representation of inventory 30. For instance, in response to the receipt of units of inventory at receiving 80 and/or the removal of units of inventory via any of the illustrated processes (e.g., shipping 70), the inventory planning and control system 180 may update inventory model 185 with new data representing the aforesaid changes in the physical units of inventory 30. In various embodiments, inventory model 185 may be stored as data within a data store, which may be configured as a database, as one or more mass storage devices (e.g., physical disks, logical volumes, etc.) configured to store data blocks or files, or in any other suitable configuration for data storage.

Various embodiments may also include an authoritative item identification component 150, which may be configured to generate and/or maintain item identifier data 170, which may be utilized to identify units within the materials handling facility (e.g., for a given unit, determine that the unit is a unit of a particular item). Item identifier data 170 may include mappings of assigned identifiers to particular physical identifiers.

As used herein, the phrase "assigned identifier" may refer to an identifier utilized by the illustrated systems to identify a particular item. For instance, inventory planning and control system may identify items by corresponding assigned identifiers. For example, inventory model 185 may include a listing of assigned identifiers corresponding to particular items; such model may also include, for each assigned identifier, a respective quantity of units of the item corresponding to that assigned identifier. In various embodiments, an assigned identifier may be a global identifier utilized to identify items across multiple materials handling facilities (such as materials handling facility 100) in a distribution network. In some embodiments, materials handling facility 100 may be part of a distribution network utilized to fulfill orders placed through an e-commerce portal; the aforesaid assigned identifiers may be utilized to identify items within the framework of the e-commerce portal.

As used herein, the phrase "physical identifier" may refer to an identifier utilized to identify a particular unit as being a unit of a particular item. In various embodiments, a physical identifier may be attached or coupled to a unit (and/or packaging in which that unit is packed). In various embodiments, physical identifiers may be electronically obtained from units of items. For instance, a physical identifier may be an identifier that may be machine-readable via an optical device (e.g., an optical scanner). One example of such a physical identifier includes a barcode (or bar code), which may be electronically obtained via a barcode scanner. Barcodes may be expressed according to various barcode symbologies including but not limited to Universal Product Code (UPC) and European Article Number (EAN). In various embodiments, other barcode symbologies or standards may be utilized, whether presently known or developed in the future. In various embodiments, physical identifiers may include any other type of identifier that may be electronically obtained from a unit. For instance, in some embodiments, items may be tagged with radio-frequency identification (RFID) tags, which may be electronically obtained with an RFID scanner. In various embodiments, physical identifiers other than barcodes and RFIDs may be utilized, whether techniques for implementing such physical identifiers are presently known or developed in the future.

Physical identifiers may be applied (e.g., attached, affixed, coupled, etc.) to a unit throughout any portion of the unit's lifecycle. For instance, a manufacturer may apply a physical identifier to a unit by including such identifier on the packaging of the unit (e.g., a UPC code printed on item packaging). In some cases, a vendor (e.g., a vendor that sources units from manufacturers) may apply a physical identifier to a unit for various record keeping purposes. In other cases, the vendor may utilize a physical identifier applied by a manufacturer from which the unit was sourced.

In various embodiments, for a given item (of multiple items processed by materials handling facility 100), item identifier data 170 may include a record that indicates that item's assigned identifier as well as one or more corresponding physical identifiers for that item. Such physical identifiers may be obtained through a variety of techniques. As described above, physical identifiers may be determined by electronically obtaining such identifiers from units of a particular item. In some cases, physical identifiers may be obtained by receiving information from one or more external data sources, such as a database of aggregated physical identifiers for various items.

In some cases, a unit received at receiving 80 may include multiple physical identifiers (e.g., multiple barcodes affixed to packaging of the unit). In some cases, some of the multiple physical identifiers may not be unique across different types of items. For instance, a physical identifier might be an identifier for a heterogeneous lot of units (i.e., a group of units including units of different items) utilized by a vendor that supplies units to materials handling facility 100. In such cases, conventional systems might prompt an agent to match a received unit to a particular item by requesting the agent select a particular item from a list items (e.g., a list of items associated with the heterogeneous lot of units). If an agent selects an incorrect item that does not represent the unit under evaluation, multiple errors may be introduced by the receiving process. For example, a control system of the materials handling facility may route the unit to an incorrect inventory location based on the agent's erroneous selection. Furthermore, an inventory model of the control system may be updated based on the agent's erroneous selection. Such inconsistencies between physical inventory and a corresponding inventory model may in some cases cause inconsistencies in any business process that relies on such model. For example, an e-commerce portal that offers units of items for sale based on such an inventory model may carry out a transaction for a unit that is not actually held in inventory (i.e., the unit is out-of-stock even though the inventory model may indicate that the unit is in-stock). The implications of such inconsistencies (e.g., refunds or exchanges performed as a result of out-of-stock items and/or longer wait times for units that are eventually replenished) may provide a generally negative experience for customers.

The authoritative item identification component 150 may prevent or reduce situations in which an agent must be relied on to perform manual matching of received units to inventory items thereby negating or mitigating the aforesaid inconsistencies between physical inventory and a model of such inventory. Authoritative item identification component 150 may generate item identifier data 170, which may include, for each of multiple items, a corresponding authoritative identifier that may be relied on to accurately identify items (e.g., as may be performed during receiving 80). The manner in which authoritative item identification component 150 may generate or determine an authoritative identifier for a particular item is described in more detail below. In regard to situations in which an agent electronically obtains a physical identifier that maps to multiple items, the authoritative identifiers described herein may prevent or mitigate such situations by in many cases providing a definitive identifier for a particular item. Additionally, control system 160 may enforce policies during receiving 80 that require an agent to electronically obtain each physical identifier of a unit until a physical identifier that matches an authoritative identifier is found. In cases where no physical identifier is found that matches an authoritative identifier of item identifier data 170, one or more exception handling processes may be performed to manually enter identifiers for that unit into item identifier data 170, as described in more detail below.

Figure 2:
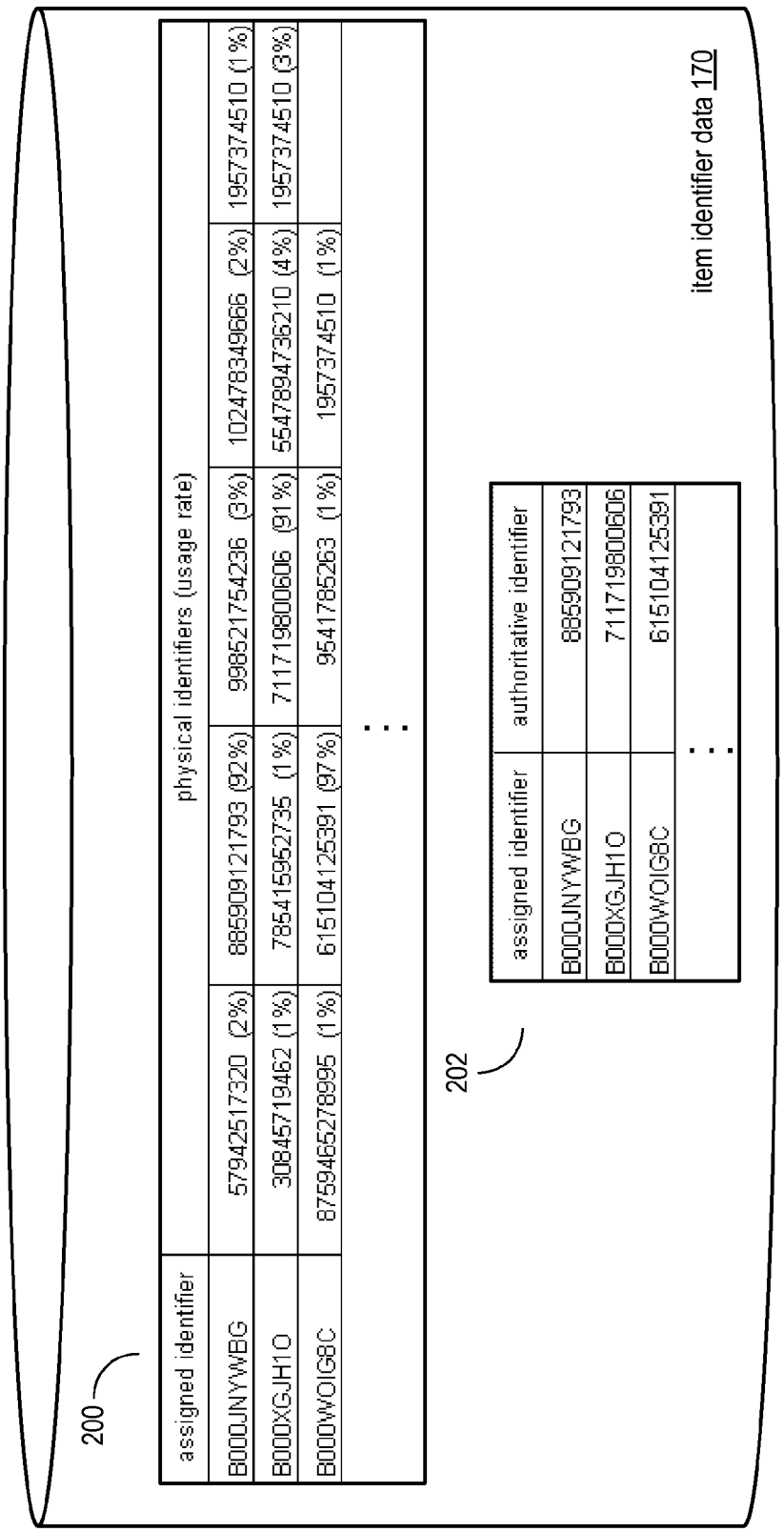
FIG. 2 illustrates a data store of item identifier data that includes various identifiers, according to some embodiments.

FIG. 2 illustrates one example of item identifier data 170, according to some embodiments. Item identifier data 170 may include, for each of multiple items, an assigned identifier as well as one or more physical identifiers associated with that assigned identifier (and the item identified by the assigned identifier). As described above, physical identifiers may be electronically obtained from corresponding items and/or obtained from one or more data sources (e.g., a vendor's or other third party's database of identifiers for items supplied by that vendor). In FIG. 2, data structure 200 is illustrated as storing multiple rows, each of which may represent a record that includes an assigned identifier for a particular item as well as one or more corresponding physical identifiers associated with that particular item.

As illustrated, data structure 200 also includes a usage rate for each physical identifier. In the illustrated embodiments, the usage rate of a given physical identifier is represented as a percentage corresponding to the quantity of instances in which that physical identifier was electronically obtained from units of the corresponding item (e.g., the item identified by the assigned identifier of the same row). For example, according to the data of the illustrated data structure corresponding to the item identified by assigned identifier B000JNYWBG, physical identifier 885909121793 represents 92% of all physical identifiers electronically obtained for that item.

In various embodiments, physical identifiers may be electronically obtained as part of performing various operations within materials handling facility 100. For example, during picking 40, agents may obtain pick lists that specify one or more units of particular items that are to be picked from inventory. In various embodiments, each time an agent is requested to pick a unit of a particular item, authoritative item identification component 150 may generate a record of the physical identifier that is electronically obtained in response to such request. Based on such data, the authoritative item identification component 150 may generate the usage rates illustrated as part of data structure 200. In addition to pick lists, various other operations within materials handling facility 100 may include an agent handling a unit of a particular item for various purposes. For example, agents may handle an item as part of picking 40, sorting 50, and packing 60. In various embodiments, each time an agent is requested to handle a unit of a particular item, the authoritative item identification component 150 may record the physical identifier scanned by the agent in response to the item handling request. The collection of data corresponding to data structure 200 is described in more detail below with respect to FIGS. 3 and 4. Also note that item identifier data 170 may in various embodiments be updated periodically or aperiodically throughout the course of operations of the materials handling facility. In this way, authoritative item identification component 150 may be configured to identify authoritative identifiers for various items based on the most recent version of item identifier data 170.

Figure 3:
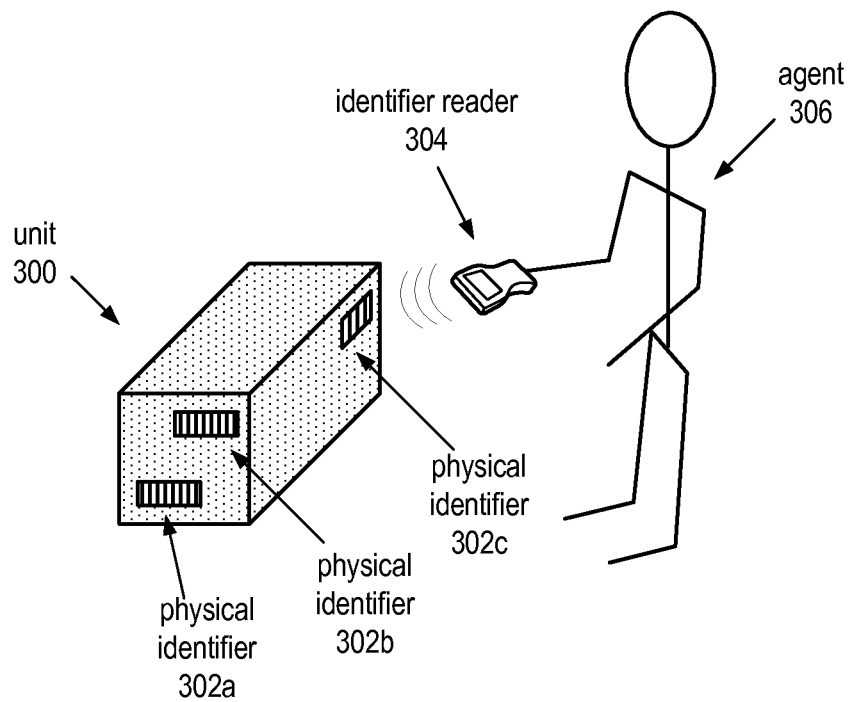
FIG. 3 illustrates an agent electronically obtaining a physical identifier from a unit, according to some embodiments.

FIG. 3 illustrates one example of an item handling request performed on a unit 300 that includes multiple physical identifiers 302*a-c*, which may be collectively referred to as physical identifiers 302. In the illustrated example, an agent 306 may utilize an identifier reader 304 configured to electronically obtain a stored representation of any of physical identifiers 302. For instance, physical identifiers 302 might be barcodes and identifier reader 304 might be a barcode reader configured to optically capture physical identifiers 302 and store such identifiers as data within memory of the reader. In another example, physical identifiers 302 might be RFID tags and identifier reader 304 might be an RFID reader. In other cases, other types of physical identifiers and/or identifier readers may be utilized, whether such elements are presently known or developed in the future. In some cases, information obtained via reader 304 may be provided to the various systems of FIG. 1, such as control system 160, authoritative item identification component 150 and/or inventory planning and control system 180. The utilization of identifier information by such systems is described in more detail below.

Figure 4:
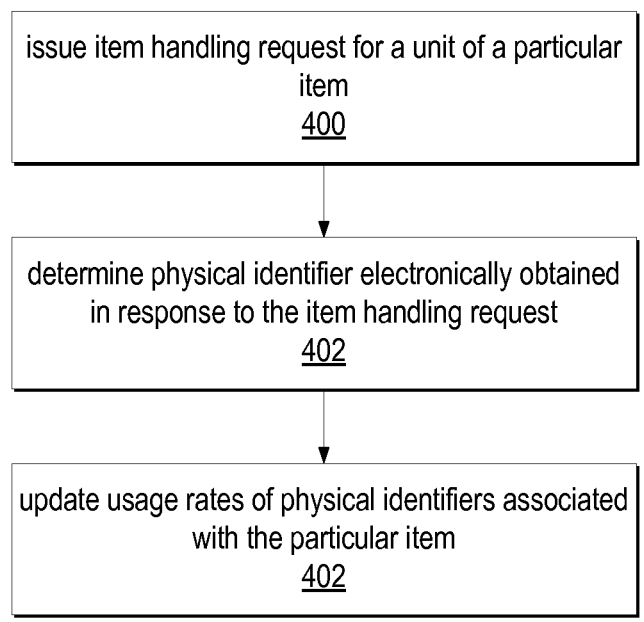
FIG. 4 illustrates a flowchart of an example method for monitoring and updating usage rates of physical identifiers, according to some embodiments.

FIG. 4 illustrates a method for collecting and updating data for usage rates of physical identifiers associated with a particular item. As illustrated by block 400, the method may include issuing an item handling request for a unit of a particular item. For instance, in one embodiment, the method may include generating a pick request to pick a particular item from inventory. For instance, the method may include issuing an item handling request, such as that described above with respect to FIG. 3. In general, an item handling request may include a request to handle a unit of a particular item for any reason including but not limited to picking, sorting, and/or packing. As illustrated by block 402, the method may also include determining a physical identifier electronically obtained in response to the item handling request of block 400. For instance, in the context of FIG. 3, the method may include determining that physical identifier 302*c* was electronically obtained in response to the item handling request. As illustrated by block 402, the method may also include updating the usage rates of physical identifiers associated with the particular item. For instance, the method may include updating usage rates similar to those described above with respect to data structure 200. As described in more detail below, the usage rates described herein may be utilized to determine authoritative identifiers.

Returning to FIG. 2, item identifier data 170 may also include a data structure 202 that includes authoritative identifiers for each of multiple items. In various embodiments, the authoritative item identification component 150 may be configured to generate such authoritative identifiers based on operations information, such as the usage rates of physical identifiers (e.g., the usage rates stored within data structure 200). For example, authoritative item identification component 150 may be configured to, for each particular item of multiple items in inventory (e.g., the inventory items identified by assigned identifiers B000JNYWBG, B000XGJH1O, B000WOIG8C), the authoritative item identification component may be configured to determine a quantity of instances in which that identifier was electronically obtained (see e.g., FIG. 3) from a unit of that particular item. For instance, the authoritative item identification component may be configured to monitor which physical identifier an agent captures in response to an item handling request (e.g., pick request, sort request, etc.) for a particular item. In various embodiments, this data may be aggregated and stored in a data store (e.g., item identifier data 170).

The authoritative item identification component may also be configured to perform a statistical analysis of the aforesaid information. For instance, the authoritative item identification component may be configured to generate the usage rates illustrated in data structure 200 by determining, for a given item (e.g., as identified by its respective assigned identifier), a statistical distribution of the use of each physical identifier associated with the given item. For example, the authoritative item identification component may determine that historically, when provided with an item handling request for a particular item, an agent scans identifier 885909121793 in 92% of such instances, identifier 998521754236 in 3% of such instances, identifier 57942517320 in 2% of such instance, identifier 102478349666 in 2% of such instances, and identifier 1957374510 in 1% of such instances. Based on such analysis, the authoritative item identification component may be configured to select or otherwise determine an authoritative identifier from such physical identifiers. For example, the authoritative item identification component may be configured to, for a given item, determine that an authoritative identifier for a given item is equivalent to the physical identifier having the highest usage rate (e.g., when compared to the usage rates of the other physical identifiers for the given item). For instance, for the item identified by assigned identifier B000JNYWBG, the authoritative item identification component may determine that the authoritative identifier for that item is to be equivalent to the physical identifier 885909121793, which is the physical identifier having the highest usage rate when compared to usage rates of the other physical identifiers. As illustrated in FIG. 2, the authoritative item identification component 150 may be configured to generate a data structure 202 that include authoritative item identifiers generated according to the techniques described herein. In some embodiments, instead of creating a separate data structure, the authoritative item identification component may be configured to modify data structure 200 by removing or "deprecating" one or more physical identifiers that are not determined to be authoritative identifiers for a particular item. In some embodiments, the removal of physical identifiers may also be performed in response to agent input, such as in response to an indication that a particular physical identifier is not an authoritative identifier for a particular item.

Authoritative item identifiers generated according to the techniques described herein may be utilized to prevent inconsistencies between physical inventory (e.g., inventory 30) and a corresponding inventory model (e.g., inventory model 185). By preventing such inconsistencies, various embodiments may prevent or reduce errors in business processes that rely on such inventory model. For instance, consider a case where data structure 200 is utilized to identify item B000JNYWBG (see e.g., FIG. 2) received at receiving stage 80. Note that some of the physical identifiers of data structure 200 are not necessarily unique for to each item. For instance, physical identifier 1957374510 is associated with each of items B000JNYWBG, B000XGJH1O, B000WOIG8C. If a receiving agent were to electronically obtain the physical identifier 1957374510 while attempting to identify the unit at receiving stage 80, a conventional system might present the agent with a list of multiple items that correspond to that physical identifier, from which the agent may select a particular item believed to be the correct item for the unit under evaluation. As described above, if an agent selects an incorrect item, this process may in some cases introduce inconsistencies between actual inventory and the corresponding inventory model. In some embodiments, the authoritative item identification component may prevent the aforesaid situation by generating data structure 202, which specifies authoritative identifiers for items of inventory. By utilizing this data set, various embodiments may prevent or mitigate the need to prompt an agent for a selection of an item from a listing of multiple items, and thus prevent or mitigate errors introduced by such selection. For instance, consider a scenario similar to that described above where an agent electronically obtains physical identifier 1957374510 while attempting to identify a unit at receiving stage 80. Instead of presenting the agent with a selection of multiple items (since that physical identifier maps to multiple items), authoritative item identification component may enforce a policy that requires the agent to scan another physical identifier until an authoritative identifier is found, such as an authoritative identifier of data structure 202. (If no authoritative identifier is found, the unit may be sent to an exception handling process to determine its identity.)

Figure 5:
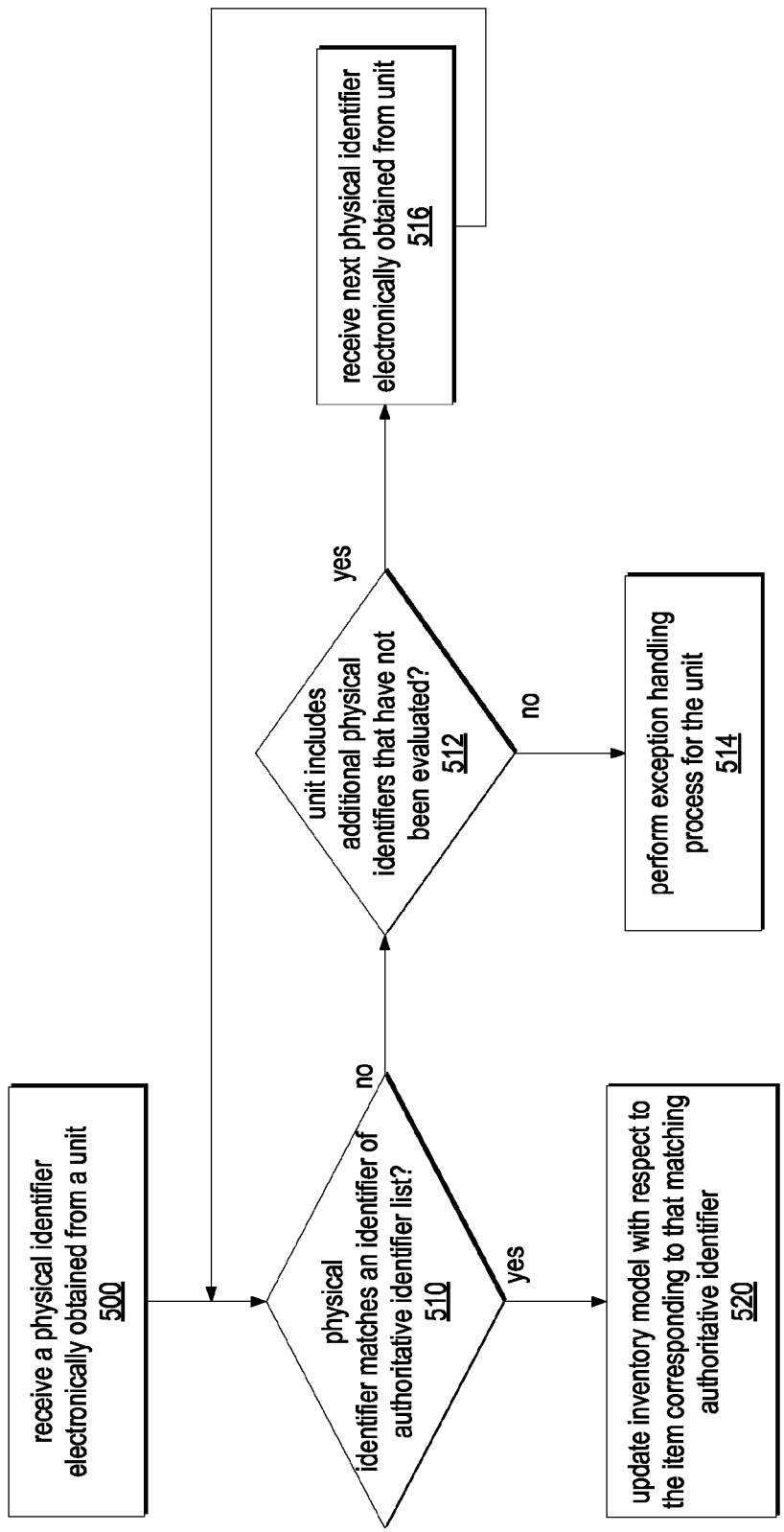
FIG. 5 illustrates a flowchart of an example method for identifying received units based on a list of authoritative identifiers as well as updating an inventory model based on such identification, according to some embodiments.

FIG. 5 illustrates an example method for enforcing such a policy. As illustrated by block 500, the method includes receiving a physical identifier electronically obtained from a unit. For instance, the method may include receiving a physical identifier that is electronically obtained from a unit during a receiving process (e.g., receiving 80). As illustrated block 510, the method may also include determining whether the physical identifier matches an identifier of an authoritative identifier list, an example of which includes data structure 202 described above. As indicated by the positive output of block 510, if the physical identifier matches an identifier of the authoritative identifier list, the method may include updating an inventory model (e.g., inventory model 185) with respect to the item corresponding to that matching authoritative identifier (block 520). For instance, the inventory model may be updated to reflect a larger unit quantity of the item corresponding to the matching authoritative identifier. As indicated by the negative output of block 510, if the physical identifier does not match an identifier of the authoritative identifier list, the method may include determining whether the unit includes additional physical identifiers that have not been evaluated (block 512). For instance, the method may include prompting an agent to determine whether the unit includes additional physical identifiers (e.g., barcodes, RFID tags, etc.) and, if so, instructing the agent to electronically obtain an additional physical identifier from the unit. As illustrated by the negative output of block 512, if the unit does not include additional physical identifiers that have not been evaluated, the method may include performing an exception handling process for the unit (block 514). For example, such an exception handling process may include manually identifying the unit and updating the inventory model subsequent to such identification. As illustrated by the positive output of block 512, if the unit includes an additional physical identifier that has not been evaluated, the method may include receiving such physical identifier (block 516). From block 516, the method may return to block 510 to evaluate the next physical identifier.

Figure 6:
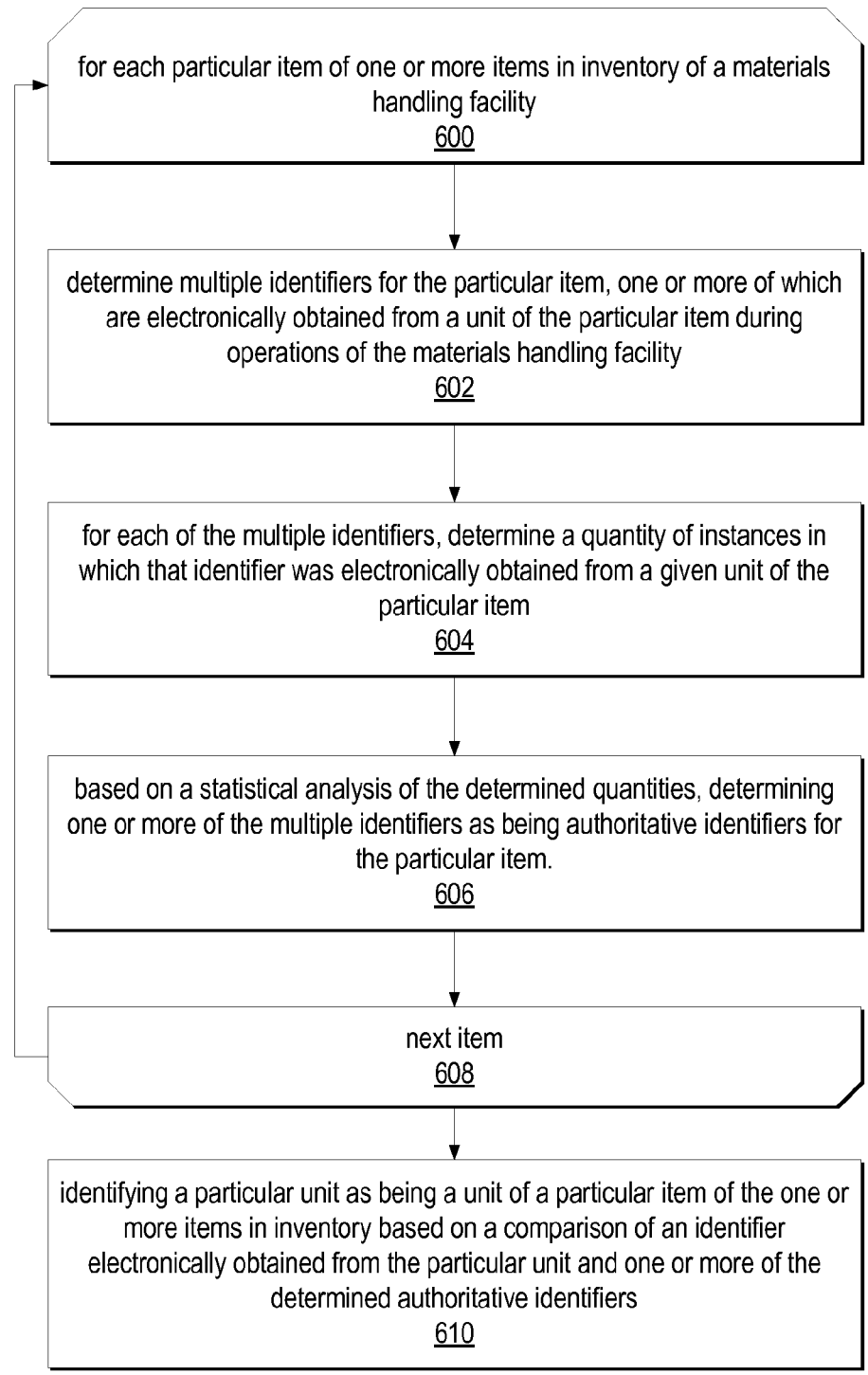
FIG. 6 illustrates a flowchart of an example method for determining authoritative identifiers and determining the item identity of a unit based on such authoritative identifiers, according to some embodiments.

Various embodiments may utilize authoritative identifiers in order to avoid the physical inventory—inventory model inconsistencies described above. FIG. 6 illustrates a flowchart of an example method for determining authoritative identifiers for items as well as using such authoritative identifiers to identify a particular unit as being a unit of a particular item. Note that in various embodiments, the authoritative item identification component 150 may be configured to perform the method of FIG. 6 (as well as any other method described herein). As illustrated by blocks 600 and 608, portions of the method may be performed for each particular item of one or more items in inventory of a materials handling facility (e.g., inventory 30). As illustrated by block 602, the method may include determining multiple identifiers for the particular item, one or more of which are electronically obtained from a unit of the particular item during operations of the materials handling facility. For example, in various embodiments, the method may include obtaining physical identifiers from one or more data sources (e.g., a vendor's database of identifiers for items supplied by that vendor). In another example, the method may include electronically obtaining a physical identifier from units of items, such as described above with respect to FIG. 3. In one example, determining multiple identifiers for a particular item may include determining physical identifiers for a particular item, such as described above with respect to data structure 200.

As illustrated by block 604, the method may include, for each of the multiple identifiers, determining a quantity of instances in which that identifier was electronically obtained from a given unit of the particular item. For instance, each time an agent responds to an item handling request for the particular item (e.g., a pick request, sort request, etc.), the method may include determining which physical identifier the agent electronically obtains in response to such request. Over multiple item handling requests, the method may include, for each physical identifier electronically obtained by one or more agents, determining the number of times that physical identifier was electronically obtained. For instance, for multiple requests to pick a particular item from inventory 30, the method may include determining the frequency with which agents electronically obtain various physical identifiers. In some cases, agents overwhelmingly electronically obtain particular physical identifiers more than others, in which case those particular identifiers may be determined to be authoritative identifiers for their corresponding items, as described in more detail below.

As illustrated by block 606, the method may include, based on a statistical analysis of the determined quantities, determining one or more of the multiple identifiers as being authoritative identifiers for the particular item. For example, the method may include determining the statistical distribution of different physical identifiers scanned in response to item handling requests (e.g., pick request, sort requests, etc.) for that particular item. One example of such a statistical distribution is illustrated by the usage rates described above with respect to data structure 200. In various embodiments, determining an identifier as being an authoritative identifier may include determining that that identifier is the most frequently obtained identifier for a particular item. For instance, the method may include determining that agents overwhelmingly electronically obtain particular physical identifiers more than others for a particular item (e.g., determining that agents tend to scan particular barcodes more than other barcodes for multiple units of a particular item), in which case that particular identifier may be determined to be an authoritative identifier for the corresponding item.

In some embodiments, multiple authoritative identifiers may be determined for the same item. For instance, in some cases, units of the same item may be sourced from different vendors. In some cases, each vendor might provide the materials handling facility with units that include a physical identifier different than that of the units provided by the other vendor. Such cases may result in multiple statistically significant physical identifiers, each of which may be determined to be an authoritative identifier for the same item.

As illustrated by block 610, the method may also include identifying a particular unit as being a unit of a particular item in inventory based on a comparison of an identifier electronically obtained from the particular unit and one or more of the determined identifiers. For instance, the particular unit might be a unit received at receiving 30; the method may include comparing a physical identifier (e.g., a barcode or RFID) from the particular unit to a list of authoritative identifiers, such as described above with respect to block 510 of FIG. 5. In response to determining a match between that physical identifier and an authoritative identifier, the method may include determining that the particular unit is a unit of an item that corresponds to the matching authoritative identifier.

Various embodiments of a system and method for authoritative item identification based on facility operations, as described herein, may be executed on one or more computer systems, which may interact with various other devices. One such computer system is computer system 900 illustrated by FIG. 7, which in the illustrated example may implement authoritative item identification component 150 of FIG. 1. Computer system 900 may be capable of implementing other elements of FIG. 1, such as inventory planning and control system 180 and control system 160. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some embodiments, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions 922 and/or data 932 accessible by processor 910.

In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing an authoritative item identification component, such authoritative item identification component 150 described above, are shown stored within system memory 920. Additionally, item identifier data 170 (which may be generated by authoritative item identification component 150) may be stored with data 932 of memory 920. Such item identifier data may include any of the data structures described above (e.g., data structures 200 and 202) as well as any other results generated by the authoritative item identification component described above. In other embodiments, program instructions and/or data may be received, sent or stored upon different types of computer-accessible media or on similar media separate from system memory 920 or computer system 900. Generally speaking, a computer-accessible medium may include storage media or memory media such as magnetic or optical media, e.g., disk or CD/DVD-ROM coupled to computer system 900 via I/O interface 930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940.

In one embodiment, I/O interface 930 may be configured to coordinate I/O traffic between processor 910, system memory 920, and any peripheral devices in the computer system, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network or between nodes of computer system 900. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

Figure 7:
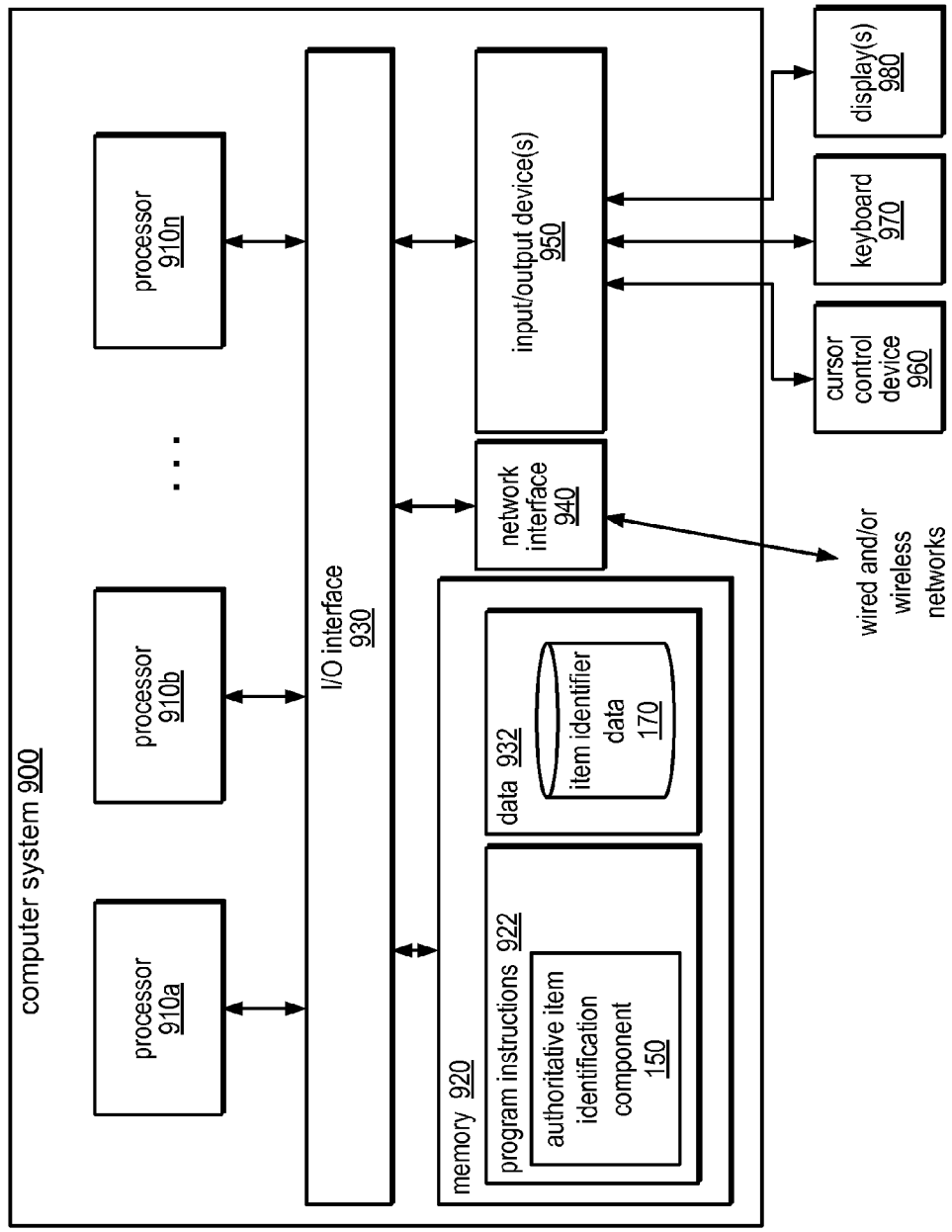
FIG. 7 illustrates an example system suitable for implementing any of the various elements of the system and method for authoritative item identification based on facility operations, according to various embodiments.

As shown in FIG. 7, memory 920 may include program instructions 922 configured to implement a authoritative item identification component, such authoritative item identification component 150. In one embodiment, authoritative item identification component 150 may implement the methods described above, such as the methods illustrated by FIGS. 4-6. In other embodiments, different elements and data may be included.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, various embodiments may be practiced with other computer system configurations.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A computer-implemented method, comprising:
for each particular item of a plurality of items in inventory of a materials handling facility:
  determining, by one or more computer processors a plurality of identifiers for the particular item, wherein said plurality of identifiers are electronically obtained from a unit of the particular item during operations of the materials handling facility;
  for each of said plurality of identifiers, determining, by one or more computer processors, a respective quantity of instances in which that identifier was electronically obtained from a plurality of given units of the particular item, wherein a different respective quantity of instances is determined for each identifier; and
  based on a statistical analysis of said quantities, determining, by one or more computer processors, one of said plurality of identifiers as being an authoritative identifier for the particular item;
  updating, by one or more computer processors, an item identifier record of the item to reflect the determined identifier as the authoritative identifier of the item; and
identifying, by one or more computer processors, a particular unit as being a unit of a particular item of said plurality of items based on a comparison of an identifier electronically obtained from said particular unit and said item identifier record.

2. The computer-implemented method of claim 1, wherein for at least the particular item of the plurality of items in inventory of the materials handling facility, the respective plurality of identifiers are stored within a data store as a set of identifiers for the particular item; wherein the method comprises:
modifying said set of identifiers by removing one or more identifiers that are not determined to be authoritative identifiers for the particular item from said set of identifiers.

3. The computer-implemented method of claim 2, wherein said comparison of the identifier electronically obtained from the particular unit and the one or more of the determined authoritative identifiers comprises a comparison of the identifier electronically obtained from the particular unit and the modified set of identifiers.

4. The computer-implemented method of claim 1, wherein said identifier electronically obtained from said particular unit is obtained as part of an inventory receive process performed at the materials handling facility.

5. The computer-implemented method of claim 1, wherein the particular unit includes multiple identifiers available to be electronically obtained from the unit, the method comprising:
determining that an agent has electronically obtained an identifier from the particular unit that is not an authoritative identifier, and in response to that determination generating a request to electronically obtain another identifier from the particular unit.

6. The computer-implemented method of claim 1, comprising: in response to identifying the particular unit as being a unit of the particular item of said plurality of items, updating an inventory record corresponding to the particular item to indicate that a unit of that particular item has been received.

7. The computer-implemented method of claim 1, wherein for each of at least some of the plurality of items in inventory of the materials handling facility, said plurality of identifiers comprise one or more identifiers obtained from third-party entities.

8. The computer-implemented method of claim 7, wherein said third-party entities include at least one vendor that provides inventory items to the materials handling facility.

9. A system, comprising:
one or more processors; and
a memory coupled to the one or more processors, wherein the memory stores program instruction executable by the one or more processors to:
  for each particular item of a plurality of items in inventory of a materials handling facility:
    determine a plurality of identifiers for the particular item, wherein said plurality of identifiers are electronically obtained from a unit of the particular item during operations of the materials handling facility;
    for each of said plurality of identifiers, determine a respective quantity of instances in which that identifier was electronically obtained from a plurality of given units of the particular item, wherein a different respective quantity of instances is determined for each identifier; and
    based on a statistical analysis of said quantities, determine one of said plurality of identifiers as being an authoritative identifier for the particular item;
    updating an item identifier record of the item to reflect the determined identifier as the authoritative identifier of the item; and
  identify a particular unit as being a unit of a particular item of said plurality of items based on a comparison of an identifier electronically obtained from said particular unit and said item identifier record.

10. The system of claim 9, wherein for at least the particular item of the plurality of items in inventory of the materials handling facility, the respective plurality of identifiers are stored within a data store as a set of identifiers for the particular item; wherein the program instructions are configured to:
modify said set of identifiers by removing one or more identifiers that are not determined to be authoritative identifiers for the particular item from said set of identifiers.

11. The system of claim 10, wherein said comparison of the identifier electronically obtained from the particular unit and the one or more of the determined authoritative identifiers comprises a comparison of the identifier electronically obtained from the particular unit and the modified set of identifiers.

12. The system of claim 9, wherein said identifier electronically obtained from said particular unit is obtained as part of an inventory receive process performed at the materials handling facility.

13. The system of claim 9, wherein the particular unit includes multiple identifiers available to be electronically obtained from the unit, wherein the program instructions are configured to:
determine that an agent has electronically obtained an identifier from the particular unit that is not an authoritative identifier, and in response to that determination generate a request to electronically obtain another identifier from the particular unit.

14. The system of claim 9, wherein the program instruction are configured to: in response to identifying the particular unit as being a unit of the particular item of said plurality of items, update an inventory record corresponding to the particular item to indicate that a unit of that particular item has been received.

15. The system of claim 9, wherein for each of at least some of the plurality of items in inventory of the materials handling facility, said plurality of identifiers comprise one or more identifiers obtained from third-party entities.

16. The system of claim 15, wherein said third-party entities include at least one vendor that provides inventory items to the materials handling facility.

17. A non-transitory computer-readable storage medium storing program instructions computer-executable to:
for each particular item of a plurality of items in inventory of a materials handling facility:
determine a plurality of identifiers for the particular item, wherein of said plurality of identifiers are electronically obtained from a unit of the particular item during operations of the materials handling facility;
for each of said plurality of identifiers, determine a respective quantity of instances in which that identifier was electronically obtained from a plurality of given units of the particular item, wherein a different respective quantity of instances is determined for each different identifier; and
based on a statistical analysis of said quantities, determine one of said plurality of identifiers as being an authoritative identifier for the particular item;
updating an item identifier record of the item to reflect the determined identifier as the authoritative identifier of the item; and
identify a particular unit as being a unit of a particular item of said plurality of items based on a comparison of an identifier electronically obtained from said particular unit and said item identifier record.

18. The medium of claim 17, wherein for at least the particular item of the plurality of items in inventory of the materials handling facility, the respective plurality of identifiers are stored within a data store as a set of identifiers for the particular item; wherein the program instructions are configured to:
modify said set of identifiers by removing one or more identifiers that are not determined to be authoritative identifiers for the particular item from said set of identifiers.

19. The medium of claim 18, wherein said comparison of the identifier electronically obtained from the particular unit and the one or more of the determined authoritative identifiers comprises a comparison of the identifier electronically obtained from the particular unit and the modified set of identifiers.

20. The medium of claim 17, wherein said identifier electronically obtained from said particular unit is obtained as part of an inventory receive process performed at the materials handling facility.

21. The medium of claim 17, wherein the particular unit includes multiple identifiers available to be electronically obtained from the unit, wherein the program instructions are configured to:
determine that an agent has electronically obtained an identifier from the particular unit that is not an authoritative identifier, and in response to that determination generate a request to electronically obtain another identifier from the particular unit.

22. The medium of claim 17, wherein the program instruction are configured to: in response to identifying the particular unit as being a unit of the particular item of said plurality of items, update an inventory record corresponding to the particular item to indicate that a unit of that particular item has been received.

23. The medium of claim 17, wherein for each of at least some of the plurality of items in inventory of the materials handling facility, said plurality of identifiers comprise one or more identifiers obtained from third-party entities.

24. The medium of claim 23, wherein said third-party entities include at least one vendor that provides inventory items to the materials handling facility.

\* \* \* \* \*